(12) United States Patent
Chang

(10) Patent No.: US 6,309,096 B1
(45) Date of Patent: Oct. 30, 2001

(54) MIXING VALVE STRUCTURE FOR DESTROYING PRESSURE DIFFERENCE BETWEEN LIQUIDS

(76) Inventor: Chen-Liang Chang, No. 24, Kuang-Ho Rd., Hsiaokang Dist., Kaohsiung (TW)

( * ) Notice: Subject to any disclaimer, the term of this patent is extended or adjusted under 35 U.S.C. 154(b) by 0 days.

(21) Appl. No.: 09/542,848

(22) Filed: Apr. 4, 2000

(51) Int. Cl.⁷ .................................................. B01F 5/00
(52) U.S. Cl. ...................... 366/143; 366/168.2; 366/280
(58) Field of Search .................. 366/143, 168.1, 366/168.2, 171.1, 172.1, 172.2, 181.4, 262, 280; 416/20 R, 197 R, 197 A

(56) References Cited

U.S. PATENT DOCUMENTS

| | | | |
|---|---|---|---|
| 1,156,409 | * | 10/1915 | Klein . |
| 1,841,414 | * | 1/1932 | McBride . |
| 1,993,446 | * | 3/1935 | Huff . |
| 2,029,688 | * | 2/1936 | Wilson . |
| 2,389,524 | * | 11/1945 | Loewenstern . |
| 2,409,339 | * | 10/1946 | Ballard . |
| 2,793,166 | * | 5/1957 | Hatch ................................... 366/143 |
| 3,623,705 | * | 11/1971 | Townsley et al. . |
| 4,049,244 | * | 9/1977 | Hedrich ................................ 366/143 |
| 4,838,703 | * | 6/1989 | McMaster et al. . |
| 6,193,406 | * | 2/2001 | Peltonen et al. ..................... 366/280 |

FOREIGN PATENT DOCUMENTS

| | | | |
|---|---|---|---|
| 4-78430 | * | 3/1992 | (JP) ..................................... 366/280 |
| 1678426 | * | 9/1991 | (SU) ..................................... 366/280 |
| 371466 | | 10/1999 | (TW) . |
| 371467 | | 10/1999 | (TW) . |

* cited by examiner

Primary Examiner—Charles E. Cooley
(74) Attorney, Agent, or Firm—Bacon & Thomas, PLLC

(57) ABSTRACT

A valve structure is provided for destroying pressure difference between incoming fluids. The valve body includes two inlet passages and a merging passage that is communicated to an outlet. A pressure-balancing device is mounted in the merging passage and includes a shaft supported by two supports or end closures. Two bladed wheels are mounted to the shaft and may be impacted by the incoming fluids to thereby destroy the pressure difference between the incoming fluids.

11 Claims, 7 Drawing Sheets

US 6,309,096 B1

MIXING VALVE STRUCTURE FOR DESTROYING PRESSURE DIFFERENCE BETWEEN LIQUIDS

BACKGROUND OF THE INVENTION

1. Field of the Invention

The present invention relates to a valve structure fed with two different liquids. The valve is constructed to destroy pressure difference between incoming fluids, thereby effectively mixing the different incoming fluids.

2. Description of the Related Art

Taiwan Utility Model Publication No. 371467, issued on Oct. 1, 1999 and entitled "PRESSURE ADJUSTING ARRANGEMENT FOR A VALVE FED WITH TWO LIQUIDS", discloses a valve body with two inlets. Output rate of each inlet is controlled by a control valve. The incoming fluids meet at a merging passage that is communicated with an outlet for outputting mixed fluid. A shaft is rotatably mounted in the merging passage by supports. A bladed wheel is mounted to each end of the shaft for compelling the incoming fluid to the merging passage.

Taiwan Utility Model Publication No. 371466, issued on Oct. 1, 1999 and entitled "VALVE FED WITH TWO LIQUIDS AND WITH A PRESSURE ADJUSTING ARRANGEMENT", discloses a valve body with two inlets for introducing fluids. A wall is formed between the inlets and includes a hole for rotatably mounting a shaft. A turbine is mounted to each end of the shaft and located adjacent to the wall. Fluids incoming from the inlets drive the turbines to rotate and thus output mixed fluid via an outlet.

The above-mentioned valve structures may destroy pressure difference between the incoming fluids to mix the fluids at a predetermined ratio by forcible feeding. Nevertheless, manufacture of the valve structures is found troublesome, and the mixing homogeneity is found unsatisfactory.

SUMMARY OF THE INVENTION

It is a primary object of the present invention to provide a valve structure for destroying pressure difference of the incoming fluids that is easy to process and manufacture.

It is a secondary object of the present invention to provide a valve structure for destroying pressure difference of the incoming fluids that provides mixed fluid with excellent homogeneity.

It is a third object of the present invention to provide a valve structure for destroying pressure difference of the incoming fluids that is easy to clean the inside of the valve.

A valve structure in accordance with the present invention includes a valve body with two inlet passages and a merging passage. A pressure-balancing device is mounted in the merging passage and includes a shaft with two bladed wheels for compelling two different fluids and for rotating the shaft. Thus, the two different fluids are forced to mix with each other. In addition, an agitator may be mounted between the bladed wheels to provide well-mixed fluid with excellent homogeneity.

Other objects, specific advantages, and novel features of the invention will become more apparent from the following detailed description of the embodiments when taken in conjunction with the accompanying drawings.

DETAILED DESCRIPTION OF THE PREFERRED EMBODIMENTS

Figure 1:
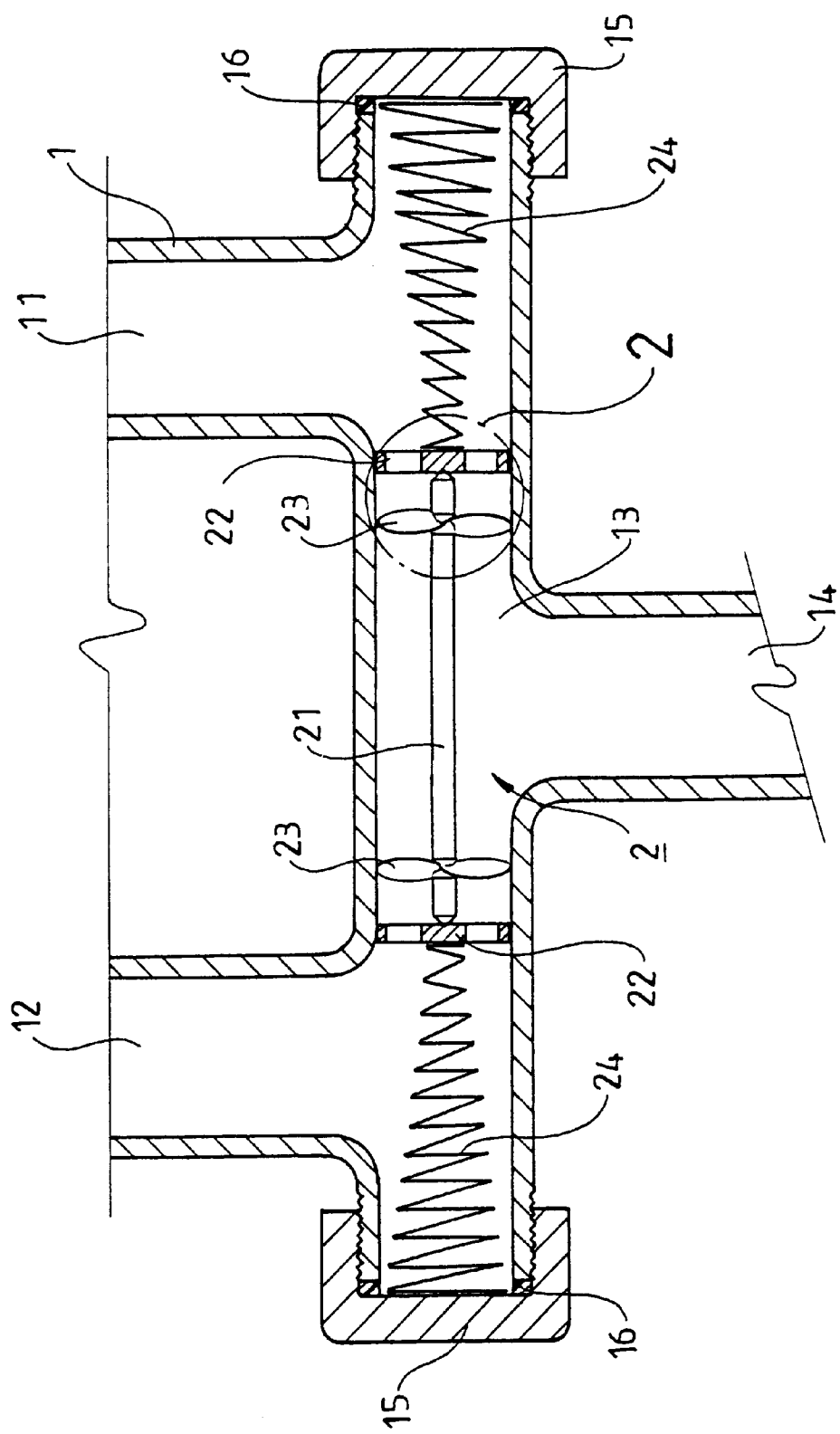
FIG. 1 is a sectional view of a first embodiment of a valve structure in accordance with the present invention.

Referring to FIG. 1, a first embodiment of a valve structure in accordance with the present invention generally includes a valve body 1 and a pressure-balancing device 2. The valve body 1 includes control means (not shown) for controlling flow of incoming fluids. Incoming fluids enter the valve body 1 via two inlet passages 11 and 12 that meet at a merging passage 13 and then outputted via an outlet 14. The merging passage 13 is a straight passage having two end closures 15 respectively mounted to two ends thereof. Each end closure 15 may be an end cap threadedly engaged to an associated end of the merging passage 13, and an anti-leak element 16 (e.g., an anti-leak rubber ring) may be provided to avoid leakage of fluid.

Figure 2:
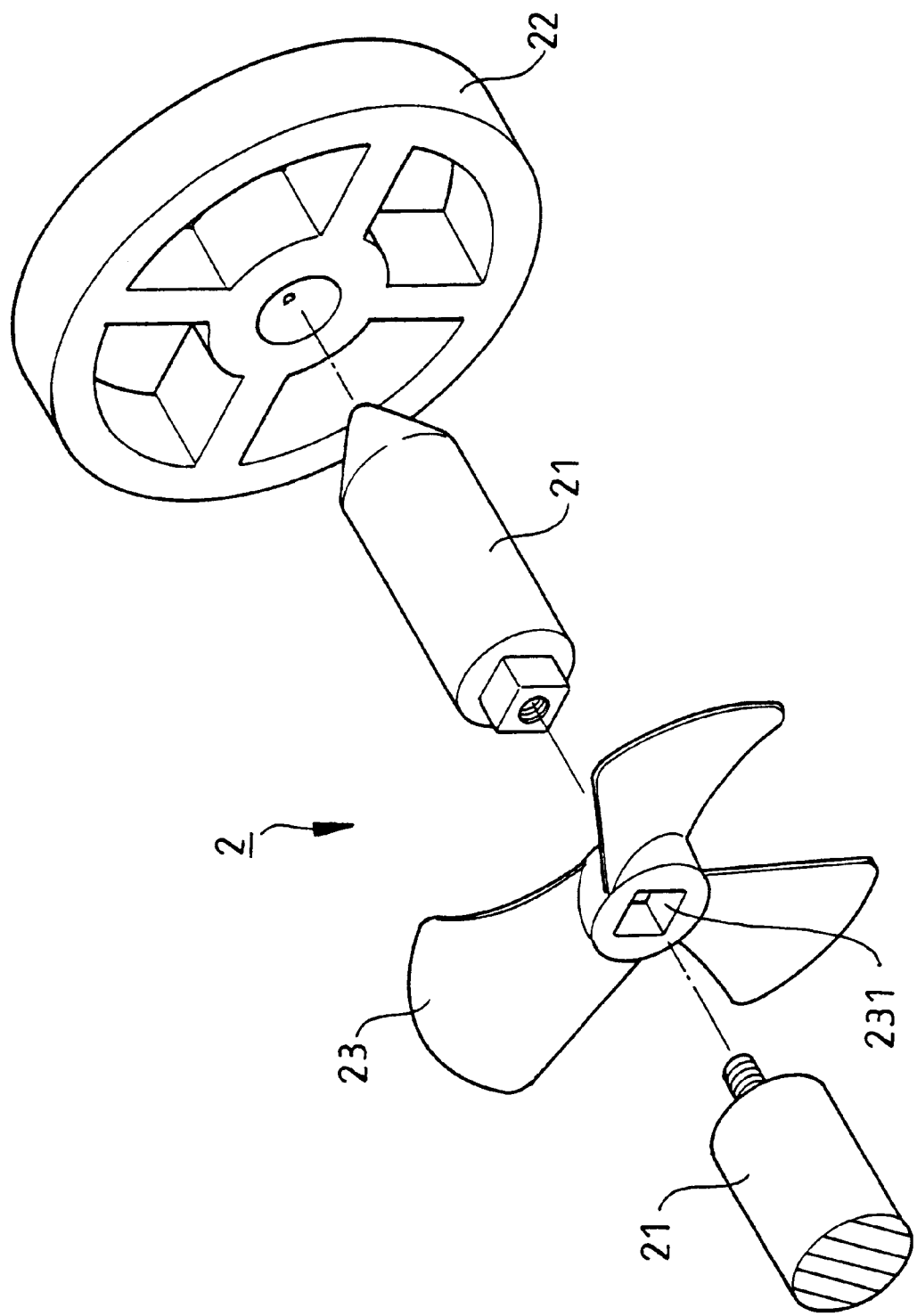
FIG. 2 is an enlarged exploded perspective view of a circle in FIG. 1.

The pressure-balancing device 2 is mounted in the merging passage 13 of the valve body 1. As illustrated in FIG. 1, the pressure-balancing device 2 includes a shaft 21 having two ends rotatably held by two supports 22, respectively. Bladed wheels 23 are mounted to the shaft 21. The bladed wheels 23 may be the axial bladed wheels or the centrifugal bladed wheels. In this embodiment, as illustrated in FIG. 2, each bladed wheel 23 includes a non-circular hole 231 for engaging with the shaft 21 to rotate therewith. The shaft 21 may include a number of shaft sections that are threadedly engaged together. Threading of each shaft section may have an appropriate lead (left or right) such that the shaft sections are further securely engaged with each other when the bladed wheels 23 rotate. Each support 22 includes an outer diameter substantially the same as or slightly smaller than an inner diameter of the merging passage 13 to assure rotation of the shaft 21 about a fixed central axis. A retaining member 24 (in the form of a spring in this embodiment) includes a first end attached to an outer side of an associated support 22 and a second end attached to an associated end closure 15.

Figure 3:
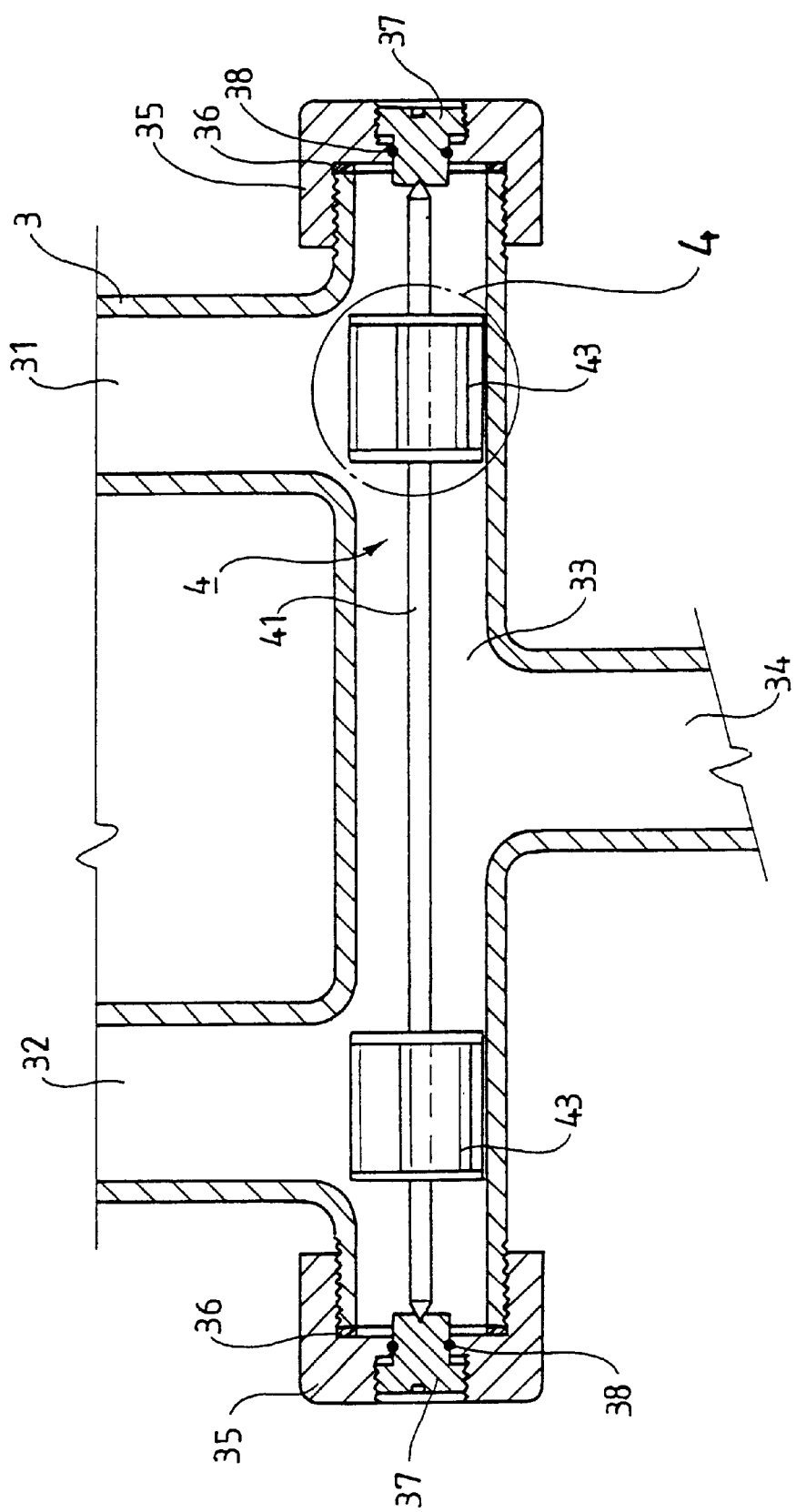
FIG. 3 is a sectional view of a second embodiment of the valve structure in accordance with the present invention.
Figure 4:
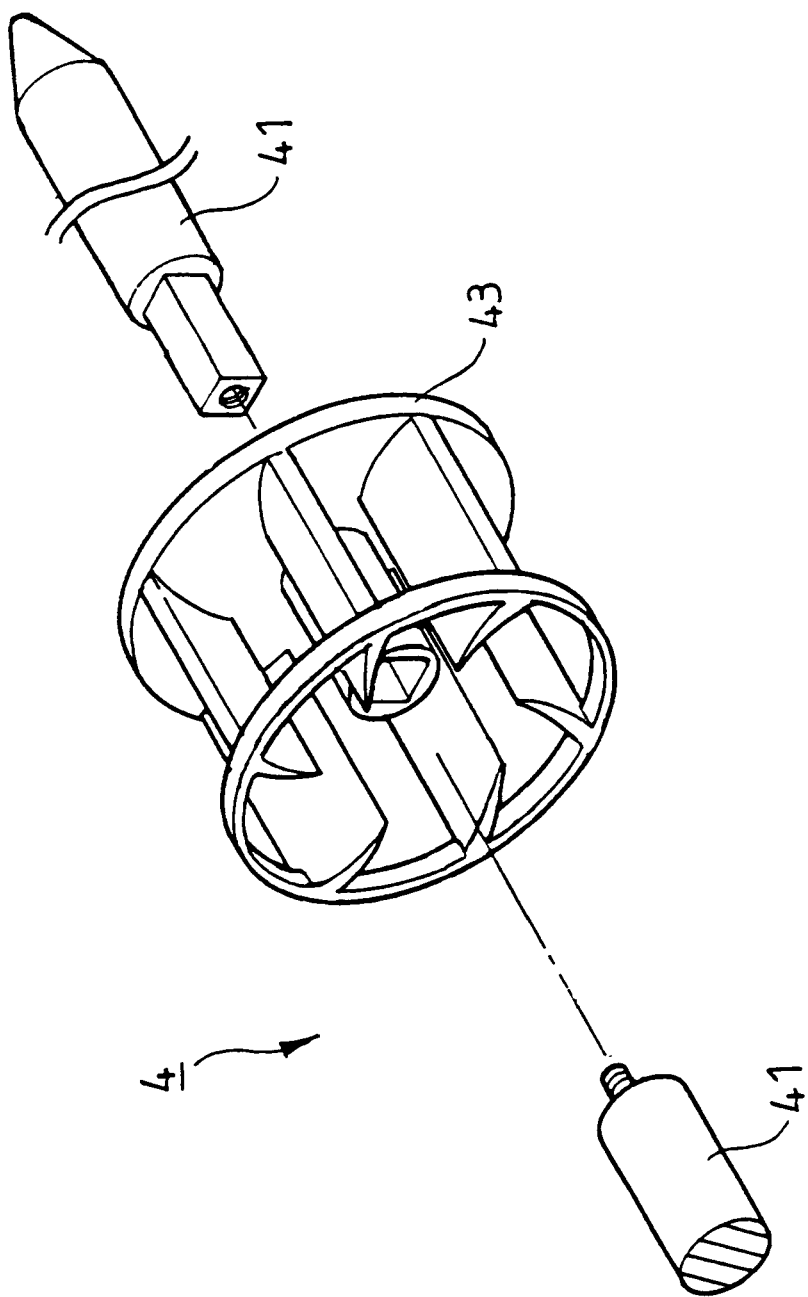
FIG. 4 is an enlarged exploded perspective view of a circle in FIG. 3.

FIGS. 3 and 4 illustrate a second embodiment of the valve structure in accordance with the present invention. In this embodiment, the valve structure includes a valve body 3 and a pressure-balancing device 4. The valve body 3 includes control means (not shown) for controlling flow of incoming fluids. Incoming fluids enter the valve body 3 via two inlet passages 31 and 32 that meet at a merging passage 33 and then outputted via an outlet 34. The merging passage 33 is a straight passage having two end closures 35 respectively mounted to two ends thereof. Each end closure 35 may be an end cap threadedly engaged to an associated end of the merging passage 33, and an anti-leak element 36 (e.g., an anti-leak rubber ring) may be provided to avoid leakage of fluid. In addition, each end closure 35 includes an adjusting member 37 (e.g., a turnable bolt) mounted therein. A seal 38 is provided between the end closure 35 and the adjusting member 37.

The pressure-balancing device 4 is mounted in the merging passage 33 of the valve body 3. As illustrated in FIG. 3, the pressure-balancing device 4 includes a shaft 41 having two ends rotatably held by the adjusting members 37, respectively. The adjusting members 37 may be turned to adjust holding tightness to the shaft 41. Two bladed wheels 43 are mounted to the shaft 41 to rotate therewith. As illustrated in FIG. 3, each bladed wheel 43 is mounted in the merging passage 33 in a position that faces an associated inlet passage 31, 32. Thus, the bladed wheels 43 are compelled to rotate when they are impacted by incoming fluids from the inlet passages 31 and 32. The bladed wheels 43 may be the centrifugal bladed wheels aimed to the inlet passage 31 and 32. The bladed wheels 43 may be the axial bladed wheels that is no need to aim to the inlet passage 31 and 32 having the same effect of the centrifugal bladed wheels.

Figure 5:
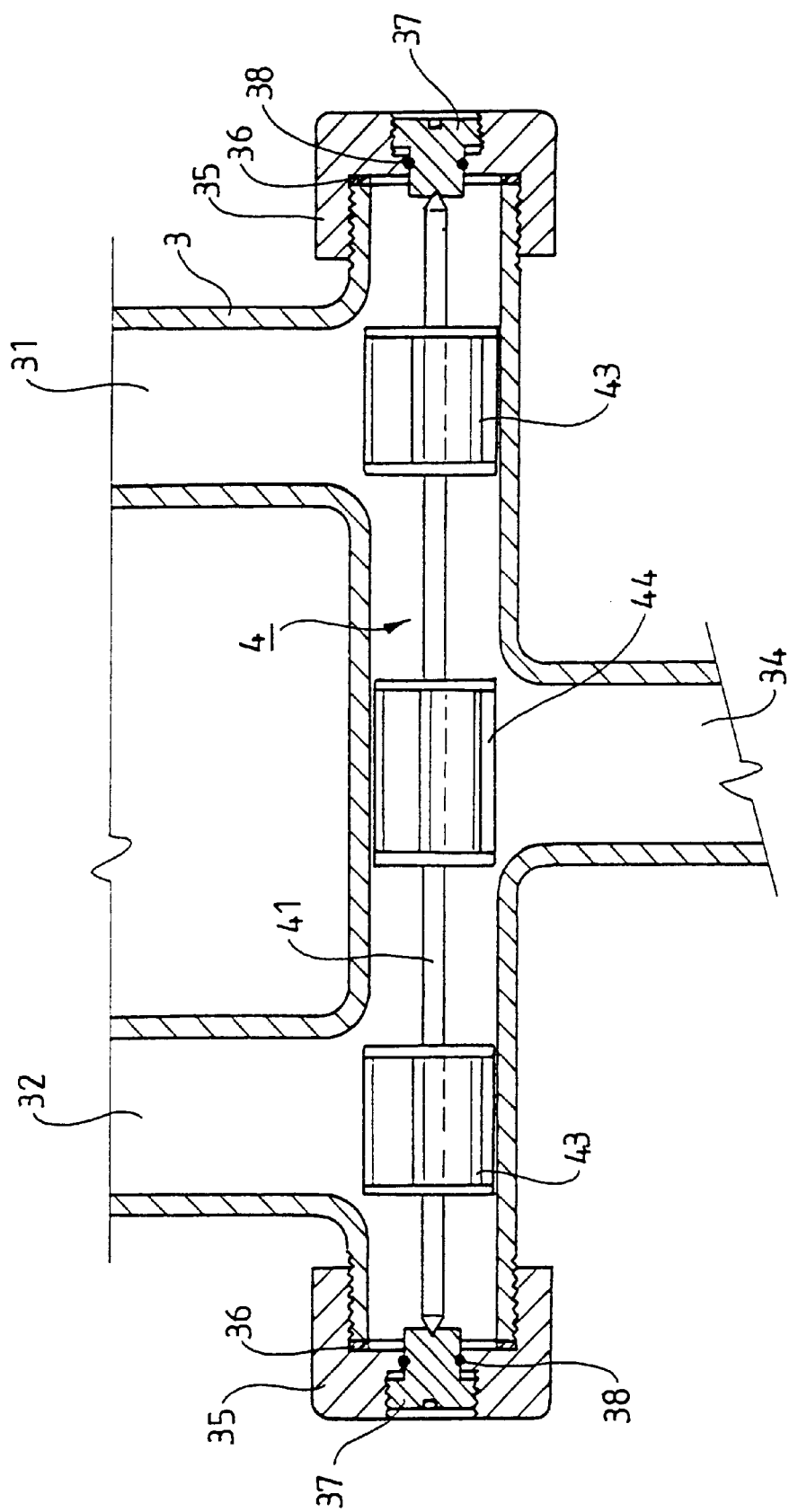
FIG. 5 is a sectional view of a third embodiment of a valve structure in accordance with the present invention.

FIG. 5 illustrates a third embodiment of the valve structure in accordance with the present invention that is substantially modified from the second embodiment. The valve structure includes a valve body 3 and a pressure-balancing device 4. In this embodiment, an agitator 44 is mounted to the shaft 41. Pressure difference between incoming fluids from the inlet passages 31 and 32 is destroyed by the pressure-balancing device 4. The fluids are then mixed by the agitator 44 to provide well-mixed fluid with excellent homogeneity which is then outputted via the outlet 34.

Figure 6:
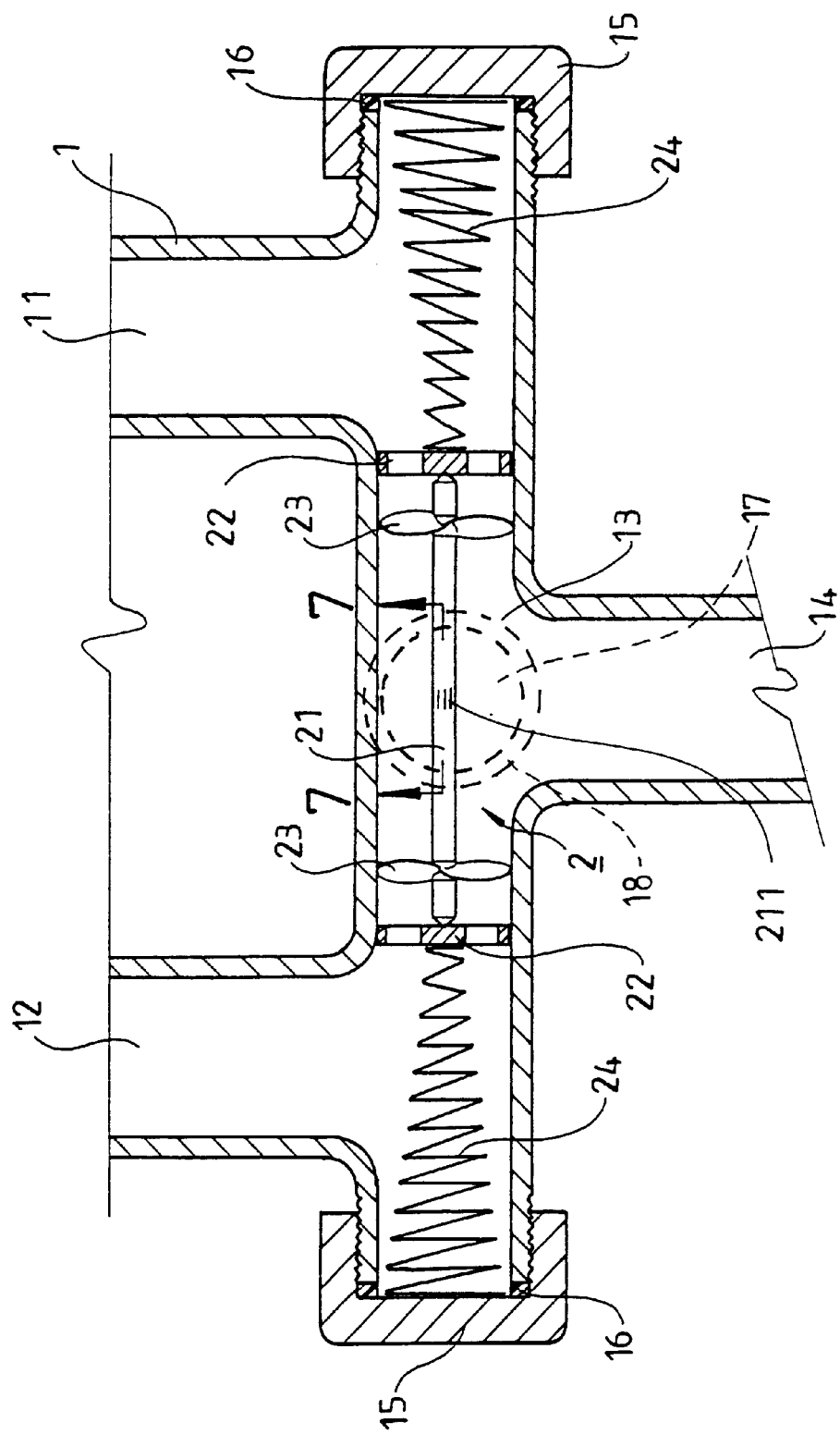
FIG. 6 is a sectional view similar to FIG. 1, illustrating a fourth embodiment of the valve structure in accordance with the present invention.
Figure 7:
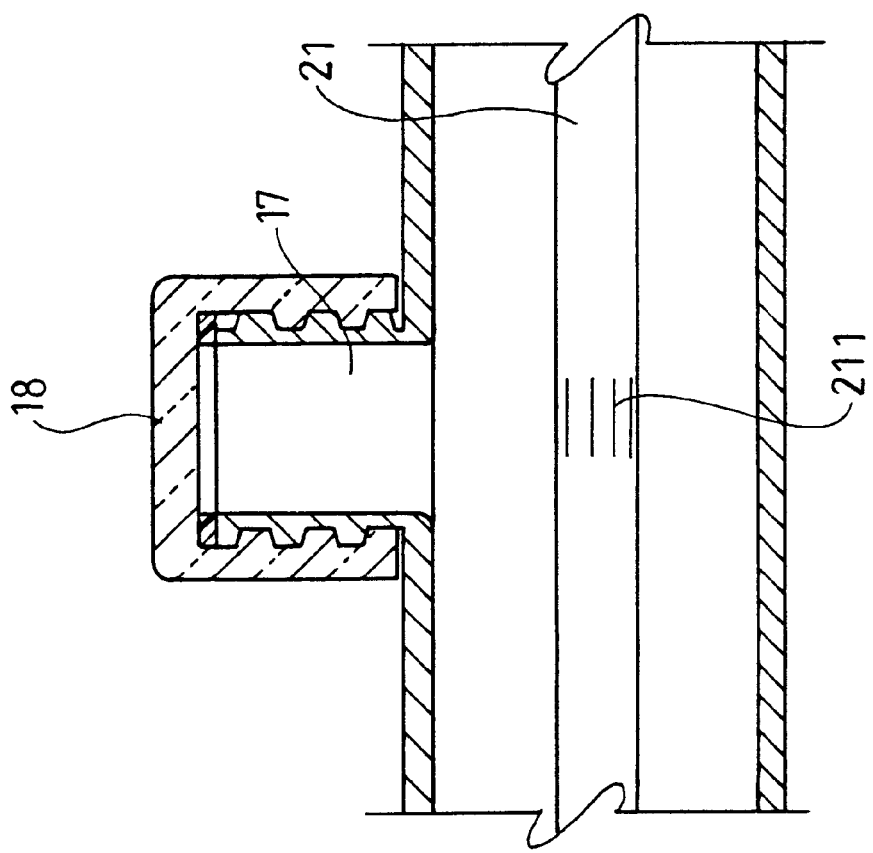
FIG. 7 is a sectional view taken along line 7—7 in FIG. 6.

FIGS. 6 and 7 illustrate a fourth embodiment of the valve structure in accordance with the present invention. In this embodiment that is modified from the first embodiment, an opening 17 is provided on the valve body 1 and covered by a cover 18. The cover 18 is openable to expose the opening 17 such that detergent can be added into the valve body 1 to remove scale. The cover 18 may be made of transparent material. Thus, in addition to open/close the opening 17, the cover 18 may be used to monitor rotation of the shaft 21. If desired, marks 211 may be provided on the shaft 21 so as to be viewed via the transparent cover 18. Thus, rotation of the shaft 21 can be clearly monitored.

The valve structure in accordance with the present invention can be processed and manufactured in an easier manner. The shaft can be held at proper holding tightness to allow smoother rotation of the shaft. Thus, potential sticking problem of the shaft is avoided. In addition, homogeneity of the mixed fluid is excellent and the mixing ratio can be controlled precisely. Namely, homogeneous mixing of two fluids of different density can be accomplished. Furthermore, the cover and opening mounted to the valve body allow easy removal for cleaning the inside of the valve and is made of transparent material for monitoring of rotation of the shaft.

Although the invention has been explained in relation to its preferred embodiment as mentioned above, it is to be understood that many other possible modifications and variations can be made without departing from the spirit and scope of the invention. It is, therefore, contemplated that the appended claims will cover such modifications and variations that fall within the true scope of the invention.

What is claimed is:

1. A valve structure for destroying pressure difference, comprising:

a valve body including a first inlet passage for a first fluid, a second inlet passage for a second fluid, and a merging passage communicated with the first inlet passage and the second inlet passage, the merging passage being communicated to an outlet of the valve body, the first fluid and the second fluid being capable of entering the valve body via the first inlet passage and the second inlet passage, respectively and then outputted via the outlet, the merging passage including two ends, an end closure being mounted to each said end of the merging passage; and a pressure-balancing device mounted in the merging passage and including a shaft having two ends, two supports being mounted in the merging passage for rotatably holding the two ends of the shaft, respectively, a retaining member being mounted between an associated said end closure and an associated said support for retaining the associated said support in place, two bladed wheels being mounted to the shaft to rotate therewith, whereby flow of the first fluid and the second fluid compels the bladed wheels and the shaft to rotate.

2. The valve structure for destroying pressure difference as claimed in claim 1, wherein the support includes an outer diameter the same as an inner diameter of the merging passage.

3. The valve structure for destroying pressure difference as claimed in claim 1, wherein the support includes an outer diameter slightly smaller than an inner diameter of the merging passage.

4. The valve structure for destroying pressure difference as claimed in claim 1, wherein the retaining member is an elastic member.

5. The valve structure for destroying pressure difference as claimed in claim 1, wherein the bladed wheels are axial bladed wheels or centrifugal bladed wheels.

6. The valve structure for destroying pressure difference as claimed in claim 1, wherein the bladed wheels are turbines.

7. The valve structure for destroying pressure difference as claimed in claim 1, wherein the shaft includes a plurality of shaft sections that are threadedly engaged together, one of the shaft sections including a non-circular portion for engaging with an associated said bladed wheel.

8. The valve structure for destroying pressure difference as claimed in claim 1, wherein the valve body further comprises an opening and a cover for covering the opening, the cover being openable to expose the opening.

9. The valve structure for destroying pressure difference as claimed in claim 8, wherein the cover is made of transparent material.

10. The valve structure for destroying pressure difference as claimed in claim 1, further comprising an agitator mounted on the shaft and between the bladed wheels.

11. A valve structure for destroying pressure difference, the valve structure comprising:

a valve body including a first inlet passage for a first fluid, a second inlet passage for a second fluid, and a merging passage communicating with the first inlet passage and the second inlet passage, the merging passage further being in communication with an outlet of the valve body, the first fluid and the second fluid being capable of entering the valve body through the first inlet passage and the second inlet passage, and thereafter through the outlet, the merging passage including two ends, an end closure being mounted to each said end of the merging passage;

a pressure, balancing device mounted in the merging passage and including a shaft having two ends that are rotatably held by the end closures, two bladed wheels mounted to the shaft for rotating therewith, whereby flow of the first fluid and the second fluid compels the bladed wheels and the shaft to rotate; and each said end closure including an adjusting member mounted thereon, the adjusting member rotatably holding an associated end of the shaft and being turnable for adjusting its holding tightness to the shaft.

\* \* \* \* \*